United States Patent
Kim et al.

(10) Patent No.: US 10,807,182 B2
(45) Date of Patent: Oct. 20, 2020

(54) WELDING AND CONSTRUCTION CONDITION SETTING SYSTEM, WELDING ROBOT SYSTEM, WELDING AND CONSTRUCTION CONDITION SETTING METHOD, AND WELDING AND CONSTRUCTION CONDITION SETTING PROGRAM

(71) Applicant: Kobe Steel, Ltd., Kobe-shi (JP)

(72) Inventors: Hyunseung Kim, Kanagawa (JP);
Kenji Sadahiro, Kanagawa (JP);
Toshiyuki Izumi, Kanagawa (JP);
Masatoshi Hida, Hyogo (JP);
Toshihiko Nishimura, Hyogo (JP);
Takemasa Yamasaki, Hyogo (JP)

(73) Assignee: Kobe Steel, Ltd., Kobe-shi (JP)

( * ) Notice: Subject to any disclaimer, the term of this patent is extended or adjusted under 35 U.S.C. 154(b) by 78 days.

(21) Appl. No.: 16/094,367

(22) PCT Filed: Mar. 7, 2017

(86) PCT No.: PCT/JP2017/008937
§ 371 (c)(1),
(2) Date: Oct. 17, 2018

(87) PCT Pub. No.: WO2017/183340
PCT Pub. Date: Oct. 26, 2017

(65) Prior Publication Data
US 2019/0126379 A1    May 2, 2019

(30) Foreign Application Priority Data

Apr. 18, 2016  (JP) .................................. 2016-083049

(51) Int. Cl.
*B23K 9/095*    (2006.01)
*B23K 9/12*    (2006.01)
(Continued)

(52) U.S. Cl.
CPC .......... *B23K 9/0953* (2013.01); *B23K 9/0216* (2013.01); *B23K 9/0256* (2013.01);
(Continued)

(58) Field of Classification Search
CPC .................. B23K 9/095; B23K 9/0953; G05B 2219/45135
See application file for complete search history.

(56) References Cited

U.S. PATENT DOCUMENTS 5,643,478 A * 7/1997 Dillet .................. B23K 9/0956
219/130.21
6,096,994 A    8/2000 Handa et al.
(Continued)

FOREIGN PATENT DOCUMENTS

JP        7-47209        5/1995
JP    2000-351070 A    12/2000

OTHER PUBLICATIONS

International Search Report dated May 30, 2017 in PCT/JP2017/008937 filed Mar. 7, 2017.

*Primary Examiner* — Geoffrey S Evans
(74) *Attorney, Agent, or Firm* — Oblon, McClelland, Maier & Neustadt, L.L.P.

(57) ABSTRACT

A welding and processing condition setting system includes an input device, a display device, a control device, and a database. The input device receives a retrieving operation of at least processing condition information input by an operator. The control device is configured to extract a processing condition parameter of the processing condition information from at least one of master condition data and user condition data according to the retrieving operation, extract a welding condition parameter of welding condition information corresponding to the extracted processing condition parameter from at least one of the master condition data and the user condition data, and calculate an evaluation item which is a (Continued)

result obtained by evaluating at least one of a welding amount and a working efficiency in the extracted welding condition parameters. The display device displays at least one parameter of the welding condition parameters, and the evaluation item.

16 Claims, 10 Drawing Sheets

(51) Int. Cl.
  *G05B 19/18* (2006.01)
  *B23Q 15/00* (2006.01)
  *B23K 9/025* (2006.01)
  *B23K 9/10* (2006.01)
  *B23K 9/02* (2006.01)
  *B25J 9/16* (2006.01)
  *B25J 11/00* (2006.01)

(52) U.S. Cl.
  CPC ............ *B23K 9/095* (2013.01); *B23K 9/1006* (2013.01); *B23K 9/1087* (2013.01); *B23K 9/12* (2013.01); *B23Q 15/00* (2013.01); *B25J 9/1664* (2013.01); *B25J 11/005* (2013.01); *G05B 19/18* (2013.01); *G05B 2219/45104* (2013.01)

(56) References Cited

U.S. PATENT DOCUMENTS

| | | | | |
|---|---|---|---|---|
| 6,649,870 B1* | 11/2003 | Barton | ................ | B23K 9/0953 |
| | | | | 219/137 R |
| 7,307,241 B2* | 12/2007 | Hayes | ................ | B23K 9/0953 |
| | | | | 219/130.5 |
| 8,569,646 B2* | 10/2013 | Daniel | ................ | B23K 9/0953 |
| | | | | 219/110 |
| 8,592,722 B2* | 11/2013 | Ulrich | ................ | B23K 9/1062 |
| | | | | 219/130.5 |
| 9,029,732 B2* | 5/2015 | Hirota | ................ | B23K 9/0953 |
| | | | | 219/130.01 |
| 9,442,481 B2* | 9/2016 | Davidson | ............ | B23K 9/0956 |
| 9,704,140 B2* | 7/2017 | Lamers | ................ | G06Q 10/20 |
| 9,855,622 B2* | 1/2018 | Albrecht | ................ | B23K 9/00 |
| 9,862,051 B2* | 1/2018 | Albrecht | ............ | B23K 9/1006 |
| 2013/0112673 A1* | 5/2013 | Petrilla | ................ | B23K 9/013 |
| | | | | 219/130.1 |
| 2015/0209888 A1* | 7/2015 | Hirota | ................ | B23K 9/0953 |
| | | | | 219/130.5 |
| 2017/0028499 A1* | 2/2017 | Yoshida | ............ | B23K 9/0956 |
| 2017/0113292 A1* | 4/2017 | Nishimura | ........... | B23K 9/0953 |
| 2017/0209950 A1* | 7/2017 | Nishimura | ........... | B23K 9/0953 |
| 2017/0274527 A1* | 9/2017 | Hida | ....................... | B25J 9/161 |
| 2018/0043453 A1* | 2/2018 | Yamasaki | ............. | B23K 31/02 |

* cited by examiner

FIG.5

| JOINT | GROOVE | | | | |
| --- | --- | --- | --- | --- | --- |
| | | FILLET | L SHAPE | V SHAPE | I SHAPE |
| T | 235 | 104 | ** | ** | |
| ANGLE | 10 | 1 | 2 | 2 | |
| OVERLAPPING | 57 | 4 | ** | ** | |
| BUTTING | ** | 13 | 86 | ** | |
| TAPER | ** | ** | 28 | ** | |
| FLARE | ** | 5 | ** | ** | |

| LAYER | PASS No. | CROSS-SECTIO-NAL AREA (mm^2) | WELDING HEAT INPUT (KJ/cm) |
|---|---|---|---|
| 3/3 | 1 / 3 | 36.01 | 3.3 |
| TOTAL | | 154.04 | – |

WELDING AND CONSTRUCTION CONDITION SETTING SYSTEM, WELDING ROBOT SYSTEM, WELDING AND CONSTRUCTION CONDITION SETTING METHOD, AND WELDING AND CONSTRUCTION CONDITION SETTING PROGRAM

TECHNICAL FIELD

The present invention relates to a welding and processing condition setting system of a welding robot, a welding and processing condition setting method, a welding and processing condition setting program, and a welding robot system.

BACKGROUND ART

Currently, robots are used in various fields of industries. In order to make such an industrial robot operate suitably to a predetermined work, there is a need to perform a teach work of the operation suitable to the work. The teach work is necessarily performed after the robot is operated actually and its operation is observed. Therefore, there needs labor.

Especially, in a welding work, welding conditions to each processing condition are necessarily set to be most suitable. When the processing condition and the welding condition are set, there are a number of elements, parameters, and a combination thereof. Since the conditions are optimally set based on experiences of an expert of the welding work, there is required excessive labor for a beginner of the welding work.

Regarding the simplification of the teach work of the robot, Patent Document 1 discloses a welding condition setting method in which the welding condition for work is set from information related to a part subjected to work and obtained a welding result using a registered welding condition database and three-dimensional CAD data, which contains various work targets stored in a three-dimensional CAD in advance and a worked target device. Besides a basic welding condition database registered as basic condition, the system includes an actual welding condition database in which the welding condition modified by the welding result performed based on a generated teach program is registered. Since both databases of the welding condition as the actual work result and the welding condition as the basic condition can be retrieved, an optimal welding condition can be automatically set according to an actual work. Therefore, the work hours are shortened and a welding test is reduced, so that the efficiency is increased, and resource saving is realized.

CITATION LIST

Patent Document

[Patent Document 1]: Japanese Unexamined Patent Application Publication No. 2000-351070

SUMMARY OF THE INVENTION

Problems that the Invention is to Solve

However, in the invention of the related art, there is required three-dimensional CAD data to set a welding and processing condition such as the welding condition, and thus there is required a knowledge on CAD. It is difficult to estimate a resultant quality of the actual welding according to the obtained welding condition. For example, it is difficult to estimate what result will be brought qualitatively by a bead shape, a welding amount, and a welding efficiency of the welding according to the welding condition. There is always required the experiences of an expert of the welding condition.

The invention relates to a welding and processing condition setting system, a welding and processing condition setting method, a welding and processing condition setting program, and a welding robot system using the same with which even a person who does not have specific knowledge about a welding work can easily set the welding and processing condition.

Means for Solving the Problems

According to the invention, there is provided a welding and processing condition setting system for setting a welding and processing condition of a welding robot. The welding and processing condition setting system includes an input device, a display device, a control device, and a database. The database includes master condition data stored in advance and user condition data registered at a time of actual welding, and each of the master condition data and the user condition data includes processing condition information which is related to a processing condition becoming a precondition for welding and welding condition information which is related to a welding condition associated with the processing condition. The input device receives a retrieving operation of at least processing condition information input by an operator. The control device is configured to extract a processing condition parameter of the processing condition information corresponding to the retrieving operation from at least one of the master condition data and the user condition data according to the retrieving operation of the operator, extract a welding condition parameter of welding condition information corresponding to the extracted processing condition parameter from at least one of the master condition data and the user condition data, and calculate an evaluation item which is a result obtained by evaluating at least one of a welding amount and a working efficiency in the extracted welding condition parameters. The display device displays at least one parameter of the welding condition parameters, and the evaluation item.

As an embodiment of the invention, for example, the control device compares a welding cross-sectional area of a welding portion calculated from the extracted processing condition parameter and the extracted welding condition parameter with a predetermined threshold, or compares finish speeds between the welding conditions of each of the welding portions, and displays the evaluation item with respect to the welding amount or the working efficiency by stages.

As an embodiment of the invention, for example, the database includes welding condition information which is set for each piece of processing condition information. The control device draws a stack diagram of welding portion based on the extracted processing condition parameter and the extracted welding condition parameter by a drawing function of the control device. The display device displays the drawn stack diagram.

As an embodiment of the invention, for example, the control device is configured to calculate a retrieving target number which is the number of each of retrieving targets satisfying a combination of two parameters in the extracted processing condition parameter and the extracted welding condition parameter, and create a retrieving target number table indicating the retrieving target number in a format of a matrix with the two parameters as keys. The display device displays the retrieving target number table. The display device displays at least one of the welding amount and the working efficiency, and the evaluation item with respect to the retrieving target when the retrieving target number which is received by the input device and selected by the operator is equal to or less than a predetermined value.

As an embodiment of the invention, for example, the extracted two parameters are a joint shape and a groove shape of the processing condition parameter in a first layer of the retrieving operation. The extracted two parameters are a leg length and a welding posture of the processing condition parameter in a second layer of the retrieving operation. The extracted two parameters are a groove depth and a groove angle of the processing condition parameter in a third layer of the retrieving operation. The extracted two parameters are a root face and a welding posture of the processing condition parameter in a fourth layer of the retrieving operation. At least one of the extracted two parameters is a welding condition parameter in a fifth and subsequent layers of the retrieving operation.

As an embodiment of the invention, for example, the welding condition is a main welding condition to weld a welding line. The control device retrieves at least one of a back step condition, a starting end condition, a crater condition, and a terminated end condition which are stored in the database and associated with the main welding condition in advance, and is capable of adding the retrieved condition to the main welding condition. With respect to a condition which does not exist in the back step condition, the starting end condition, the crater condition, and the terminated end condition, the input device receives a condition input by the operator and creates an additional condition using the condition received by the control device.

As an embodiment of the invention, for example, the control device edits the stack diagram according to the retrieving operation of the operator which is received by the input device. The display device displays the edited stack diagram.

A welding robot system of the invention includes the welding and processing condition setting system and a welding robot.

According to the invention, there is provided a welding and processing condition setting method for setting a welding and processing condition of a welding robot. The welding and processing condition setting method includes including, in a database, master condition data stored in advance and user condition data registered at a time of actual welding, each of the master condition data and the user condition data including processing condition information which is related to a processing condition becoming a precondition for welding and welding condition information which is related to a welding condition associated with the processing condition, receiving a retrieving operation of the processing condition information which is input by an operator, extracting a processing condition parameter of the processing condition information corresponding to the retrieving operation from at least one of the master condition data and the user condition data according to the retrieving operation of the operator, extracting a welding condition parameter of welding condition information corresponding to the extracted processing condition information from at least one of the master condition data and the user condition data, calculating an evaluation item which is a result obtained by evaluating at least one of a welding amount and a working efficiency in the extracted welding condition parameters, and displaying at least one parameter of the welding condition parameters, and the evaluation item.

According to the invention, there is also provided a welding and processing condition setting program which causes the welding and processing condition setting method to be executed in a control device in which a processor is mounted.

Advantages of the Invention

According to the invention, even a beginner of a welding work can easily retrieve and set an appropriate welding and processing condition, and a highly accurate welding can be realized with a high reproducibility.

BRIEF DESCRIPTION OF THE DRAWINGS

FIGS. 3A and 3B are enlarged views of a joint and a welding portion for describing the processing condition, wherein FIG. 3A illustrates an example of a T joint of an L shape and FIG. 3B illustrates an example of a V-shape edge-cut joint.

FIG. 5 is a diagram illustrating a retrieving target number table of a first layer.

FIGS. 10A and 10B are diagrams illustrating a state of editing a stack diagram, wherein FIG. 10A is a diagram illustrating an edit screen and FIG. 10B is a diagram illustrating an edit result confirmation screen.

MODES FOR CARRYING OUT THE INVENTION

Hereinafter, embodiments of the invention will be described in detail with reference to the accompanying drawings. First, before describing a welding and processing condition setting system for setting a welding and processing condition of a welding robot of the invention, a welding robot system to which the invention is applied will be described.

Figure 1:
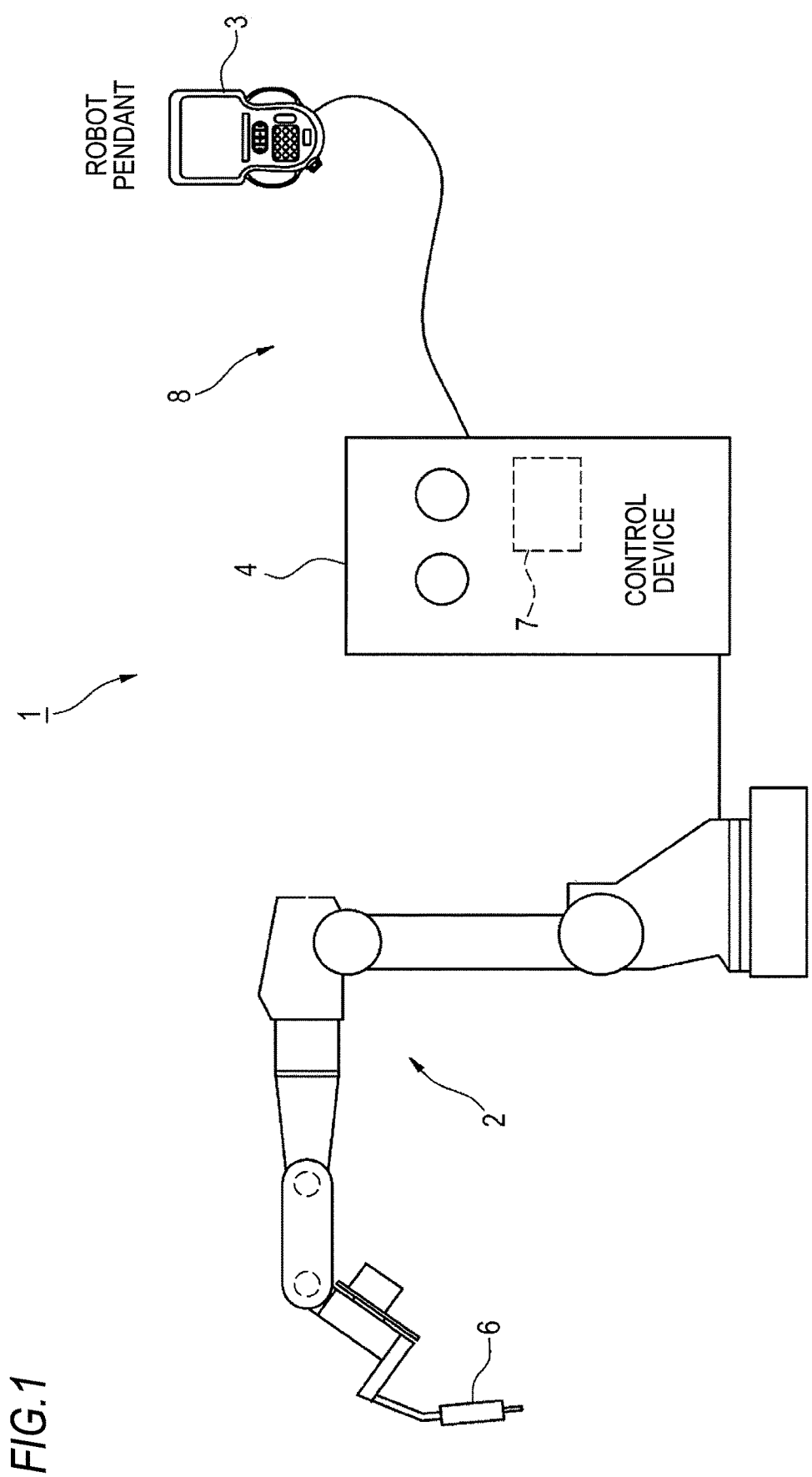
FIG. 1 is a diagram schematically illustrating a configuration of a welding robot system which includes a welding and processing condition setting system according to an embodiment of the invention.

As illustrated in FIG. 1, a welding robot system 1 includes a welding robot 2 and a control device 4 which includes a robot pendant 3 used as a teach pendant for example.

The welding robot 2 is a 6-axial industrial robot of a vertical articulated type, and to a flange part provided at the tip end thereof, a welding tool 6 including a welding torch is attached. The welding robot 2 may be mounted on a slider which is mounted and moved the welding robot 2 itself.

The control device 4 outputs an operation command to the welding robot 2 according to a program (teach program) which was taught in advance so as to control the operation of the welding robot 2. The teach program is created using the robot pendant 3 which is connected to the control device 4. The teach program may be created using an offline teach system in which a personal computer is used for example. Even in any case, the teach program is created in advance before the welding robot 2 actually performs a welding work, and commands the operation of the welding robot 2 during the welding work.

Figure 2:
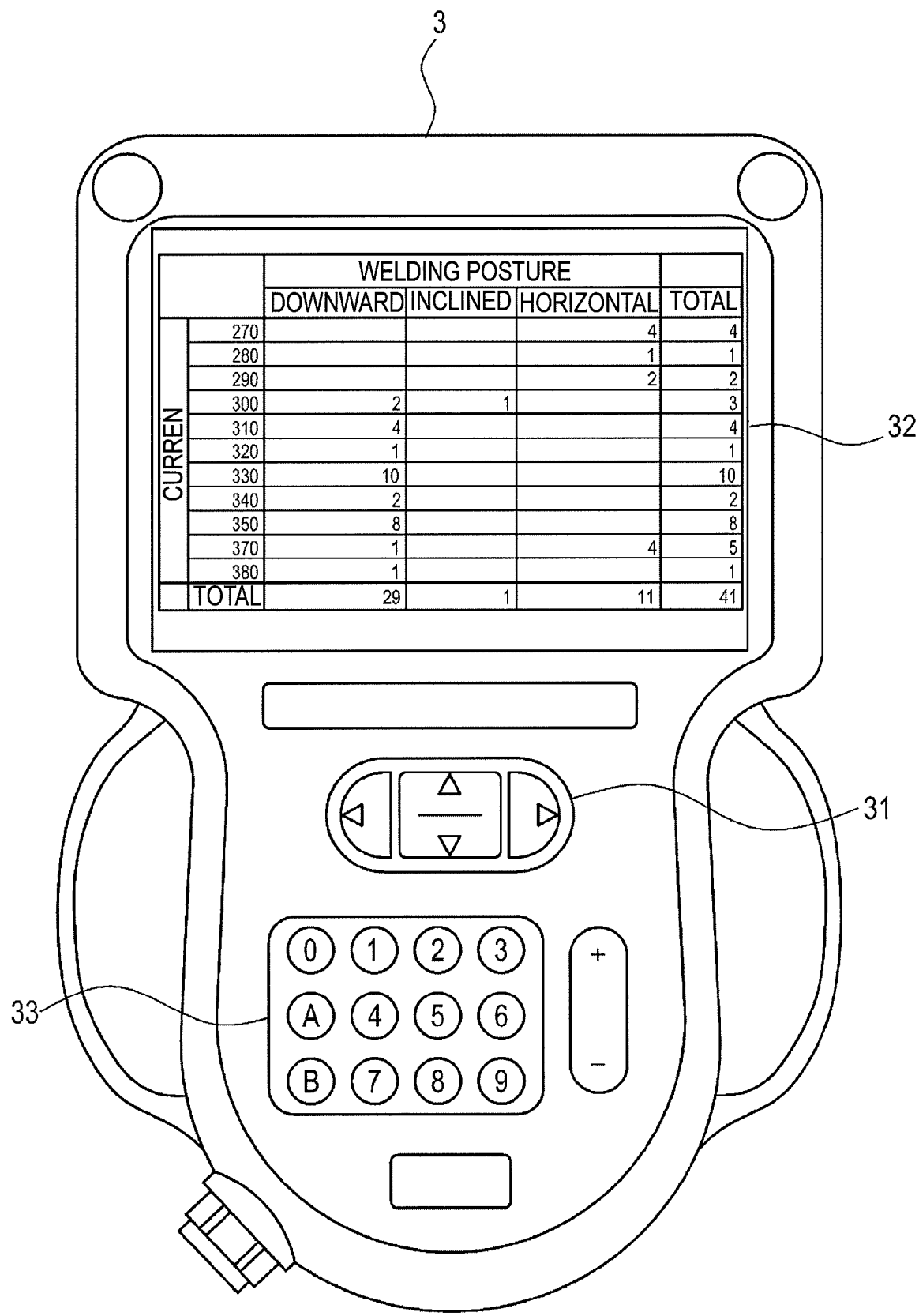
FIG. 2 is a front view of a robot pendant.

As illustrated in FIG. 2, in the robot pendant 3 is provided a screen 32 (monitor) for displaying various types of information, together with an operation button 31 and a ten key 33 for selecting information in the screen 32 and retrieving a welding condition. The operation button 31 is also used as an input button to operate the welding robot 2 and to teach the welding robot 2.

In the robot pendant 3, target welding joint information can be retrieved from a database where the welding condition is stored. Specifically, in the control device 4 and the robot pendant 3 connected thereto, there is a database which stores information related to a welding item such as a welding wire (radius and specification), a using shielding gas, and a welding power source (pulse, constant voltage), and a history of the welding conditions such as a welding current, a welding voltage, a welding speed, a torch posture, and a weaving with respect to welding joint and groove information such as a joint type, a groove shape, and a welding posture.

With the use of the database, for example, the welding condition such as the welding current, the welding voltage, the welding speed, and the torch posture is retrieved in accordance with the welding joint information such as a target joint, the groove shape, and the welding posture in the robot pendant 3. The retrieved result (welding condition) is configured to be set with respect to the welding robot 2. A database 7 in this embodiment is established by a storage device (hard disk and the like) which is provided in the control device 4. However, the database may be established by a server which is connected to the control device 4 through a network, and place, type and the like of the database are not limited.

Hereinbelow, the description will be given about embodiment of the invention, that is, a welding and processing condition setting system 8 for setting the welding and processing condition. The welding and processing condition setting system 8 includes the database 7, the control device 4 and the robot pendant 3 which serve as an input device, and a display device.

The welding and processing condition setting system 8 is a system for setting the welding and processing condition. In the related art, the welding work generally set the welding and processing condition suitable to a target welding work based on an expert's experience and evaluated while actually performing the welding. For example, even when a computer is used in setting, there was a need to handle three-dimensional CAD data and to have professional knowledge.

With the use of the system of the invention, even a person who does not have knowledge about the welding work can retrieve and select the welding and processing condition suitable to a target welding work, and can easily evaluate the welding of the welding and processing condition. Therefore, even when the type of the welding is changed or an operator is changed, it is possible to obtain high reproducibility of welding result.

The robot pendant 3 serves as an input device which receives a predetermined retrieving operation input by an operator using the operation button 31 and the ten key 33, and serves as a display device which displays predetermined information through the screen 32.

The control device 4 includes a processor for processing information and a memory, and controls the operation of the welding robot 2 by outputting the operation command to the welding robot 2 according to a program (teach program) which is taught in advance as described above. Further, the control device 4 mounted with the processor for processing information extracts various types of information from the database 7 (described below) according to a retrieving operation input by the operator through the robot pendant 3, performs a predetermined process, and outputs the information to the robot pedant 3. In the memory of the control device 4, a program for making a welding and processing condition setting method (the process) executed by (the processor of) the control device 4 is stored.

The database 7 is a storage device which stores the welding and processing condition. In this embodiment, the database 7 stores master condition data and user condition data as the welding and processing condition. The master condition data is called basic condition data. Therefore, for example, the master condition data includes data containing welding condition information and processing condition information which are stored in advance since the database 7 was established, and also includes relevant welding item information (characteristic data of a material) in advance. On the other hand, in addition to the welding condition information and the processing condition information which are basic, the user condition data is condition data to which the welding condition and the welding item information stored in the control device 4 are assigned when an individual user actually does a welding work and new processing condition information (hereinafter, referred to as "user registration condition information") is registered. The user condition data is condition data which has different user registration condition information for each individual user, and is used uniquely by the user.

In the welding and processing condition, there are a processing condition as a precondition for the welding, a welding condition which is related to the processing condition, and a user registration condition which is established by a welding item and a user. Therefore, the master condition data contains the processing condition information related to the processing condition, and the welding condition information and the welding item information related to the welding condition. The user condition data contains the processing condition information related to the processing condition, the welding condition information and the welding item information related to the welding condition, and the user registration condition information. The processing condition information is information related to the processing condition which is determined before the welding, and mainly related to the shape and the like of the joint. On the other hand, the welding condition information and the welding item information are data related to the welding condition to be followed at the time of welding, and mainly related to a method and condition of welding. The user registration condition information is welding and processing condition information which is registered based on the processing condition information and the welding condition arbitrarily set by the user are registered. The processing condition information, the welding condition information, the welding item information, and the user registration condition information can be exemplified by the following, but are not limited thereto.

Figure 3A:
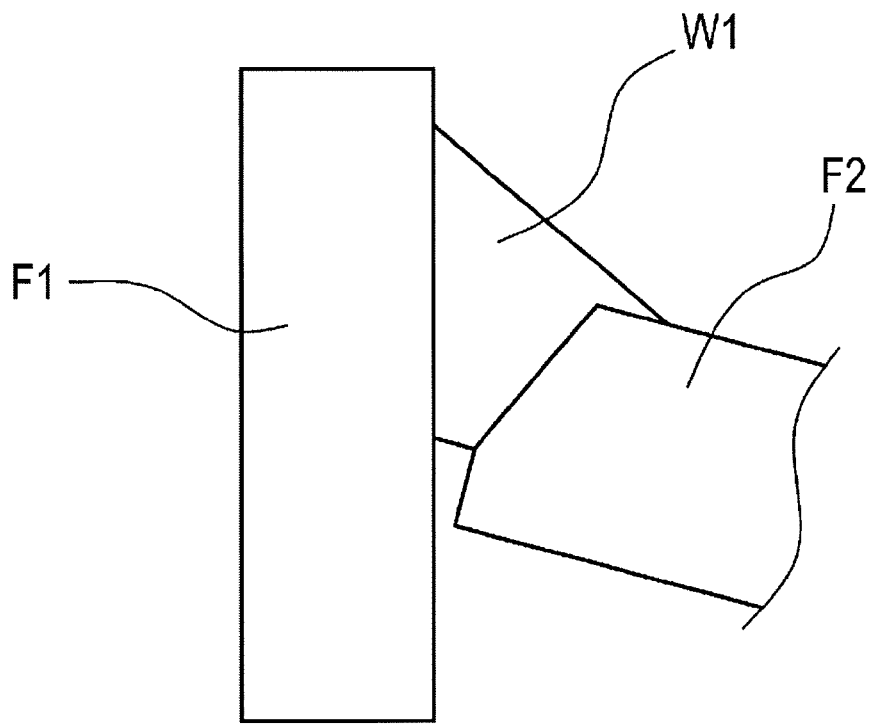
Figure 3B:
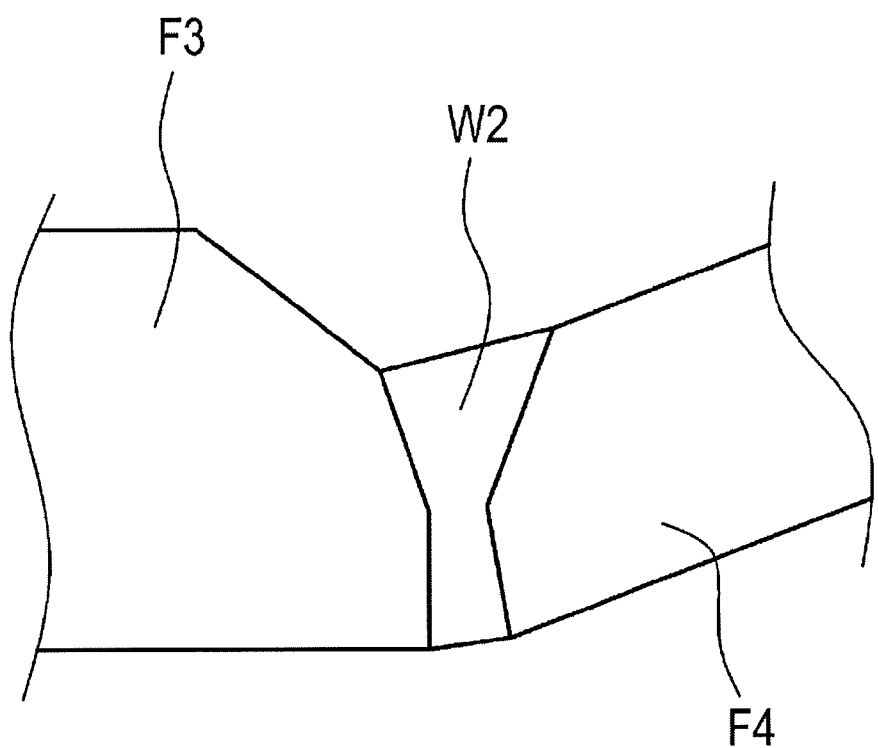

Processing condition information: joint shape, leg length, board thickness, groove shape, groove depth, groove shape, bead shape, welding posture, and the like Welding condition information: welding current, arc voltage, welding speed, and the like The welding item information: welding wire (radius and specification), using shielding gas, welding power source (pulse, constant voltage), and the like User registration condition information: joint shape, leg length, board thickness, groove shape, groove depth, groove shape, bead shape, welding posture, welding current, arc voltage, welding speed, and the like, which were created based on the processing condition and the condition which a user stored in the control device 4 when the user actually did a welding work FIGS. 3A and 3B are enlarged views of a joint and a welding portion for describing the processing condition. FIG. 3A illustrates an example in which T joints F1 and F2 are welded by an L-shape welding portion W1. FIG. 3B illustrates an example in which edge-cut joints F3 and F4 are welded by a V-shape welding portion W2. In the example of FIG. 3A, there is acquired the processing condition information indicating that the joint shape is the T joint and the groove shape is an L shape is acquired. In the example of FIG. 3B, the processing condition information indicating that the joint shape is an edge-cut joint and the groove shape is a V shape is acquired.

Figure 4:
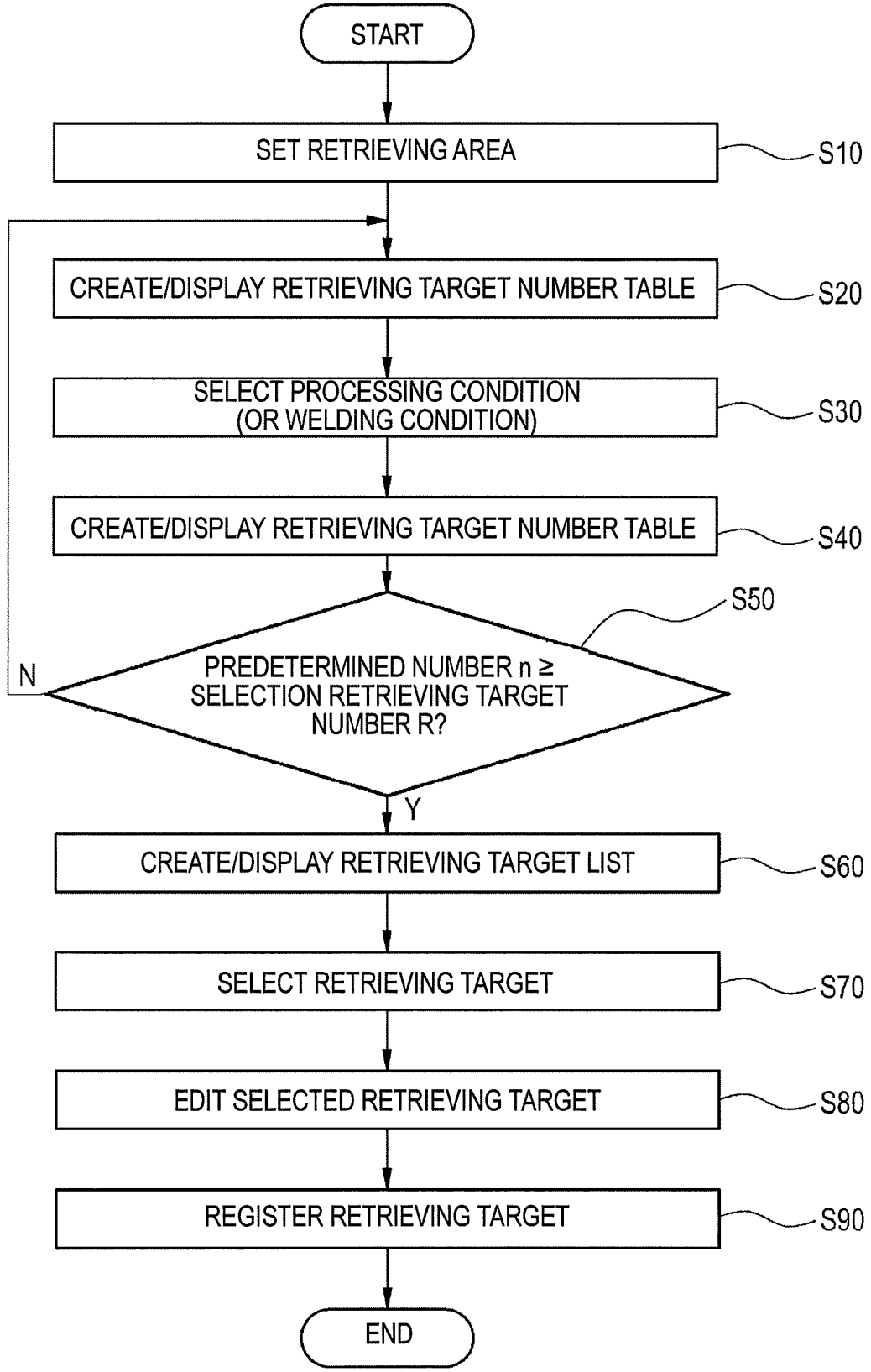
FIG. 4 a flowchart illustrating an entire procedure of a welding and processing condition setting method which is performed by the welding and processing condition setting system.

FIG. 4 is a flowchart illustrating the entire procedure of the welding and processing condition setting method which is performed by the welding and processing condition setting system 8. First, the operator inputs a retrieving area (range) from which the welding and processing condition is retrieved by the robot pendant 3. The control device 4 sets the retrieving area range according to the input operation (Step S10). In the retrieving area, there exist 1) the entire data (all of the master condition data and the user condition data), 2) the master condition data, and 3) the user condition data of the database 7. For example, if 1) the entire data is set as a default of the retrieving area in advance, and there is no setting operation of the retrieving area, 1) the entire data may be automatically set as the retrieving area. The control device 4 may set the retrieving area in an order of 1)→2)→3) according to the input operation of the operator.

After the retrieving area where the welding and processing condition is retrieved is determined in Step S10, the control device 4 calculates a retrieving target number indicating the number of each retrieving targets which satisfy a combination of the processing condition parameters of each of two pieces of the processing condition information in a first layer of the retrieving operation. Two parameters extracted in the first layer of the retrieving operation are set in advance as the joint shape and the groove shape which are the processing condition parameters.

In other words, in the example of FIG. 5, the joint shape and the groove shape are selected as two pieces of the processing condition information, and the number of retrieving targets satisfying a combination of the respective processing condition parameters is calculated. The processing condition parameter is a parameter indicating a specific type and numerical value with respect to each piece of the processing condition information. For example, in the processing condition information called a joint shape, the processing condition parameters such as "T (joint)", "Angle", and "Overlapping" are included. In the processing condition information called a groove shape, the processing condition parameter such as "Fillet", "L shape", and "V shape" is included.

Further, the control device 4 creates a retrieving target number table indicating the retrieving target number in a matric format as illustrated in FIG. 5 with two pieces of the processing condition information as keys. The robot pendant 3 displays a retrieving screen including the retrieving target number table, and displays the table in the screen 32 (Step S20). In FIG. 5, the number of retrieving targets satisfying two parameters "T (joint)" and "Fillet" is "235". Two pieces of the processing condition information are displayed in a matrix format so as to improve the operability.

Next, in this case, it is assumed that the operator selects a combination of two processing condition parameters of "T (joint)×Fillet" from the retrieving target number table in FIG. 5 using the robot pendant 3 (Step S30). In correspondence with this selection, the control device 4 calculates the retrieving target number which is the number of each of retrieving targets satisfying the combination of the processing condition parameters of each of two pieces of the processing condition information in a second layer of the retrieving operation. Two processing condition parameters extracted in the second layer of the retrieving operation are set in advance as the leg length and the welding posture.

Figure 6:
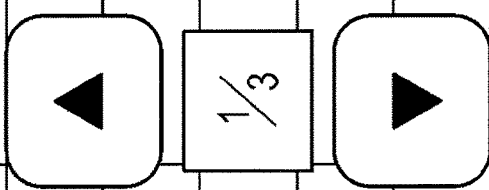
FIG. 6 is a diagram illustrating a retrieving target number table of a second layer.

In other words, in the example of FIG. 6, the leg length and the welding posture are selected as two pieces of processing condition information, and the number of each of retrieving targets satisfying the combination of the processing condition parameters is calculated. In the processing condition information called the leg length, the processing condition parameters such as "3.0*3.0", "4.0*4.0", and "4.5*4.5" are included. In the processing condition information called the welding posture, the processing condition parameters "Downward", "Horizontal", and "Horizontal 2" are included.

Further, the control device 4 creates a retrieving target number table indicating the retrieving target number in a matric format as illustrated in FIG. 6 with two pieces of the processing condition information as keys. The robot pendant 3 displays a retrieving screen including the retrieving target number table, and displays the table in the screen 32 (Step S40). In FIG. 6, the number of retrieving targets satisfying two parameters "Leg length 6.0*6.0" and "Downward" is "10".

Figure 7:
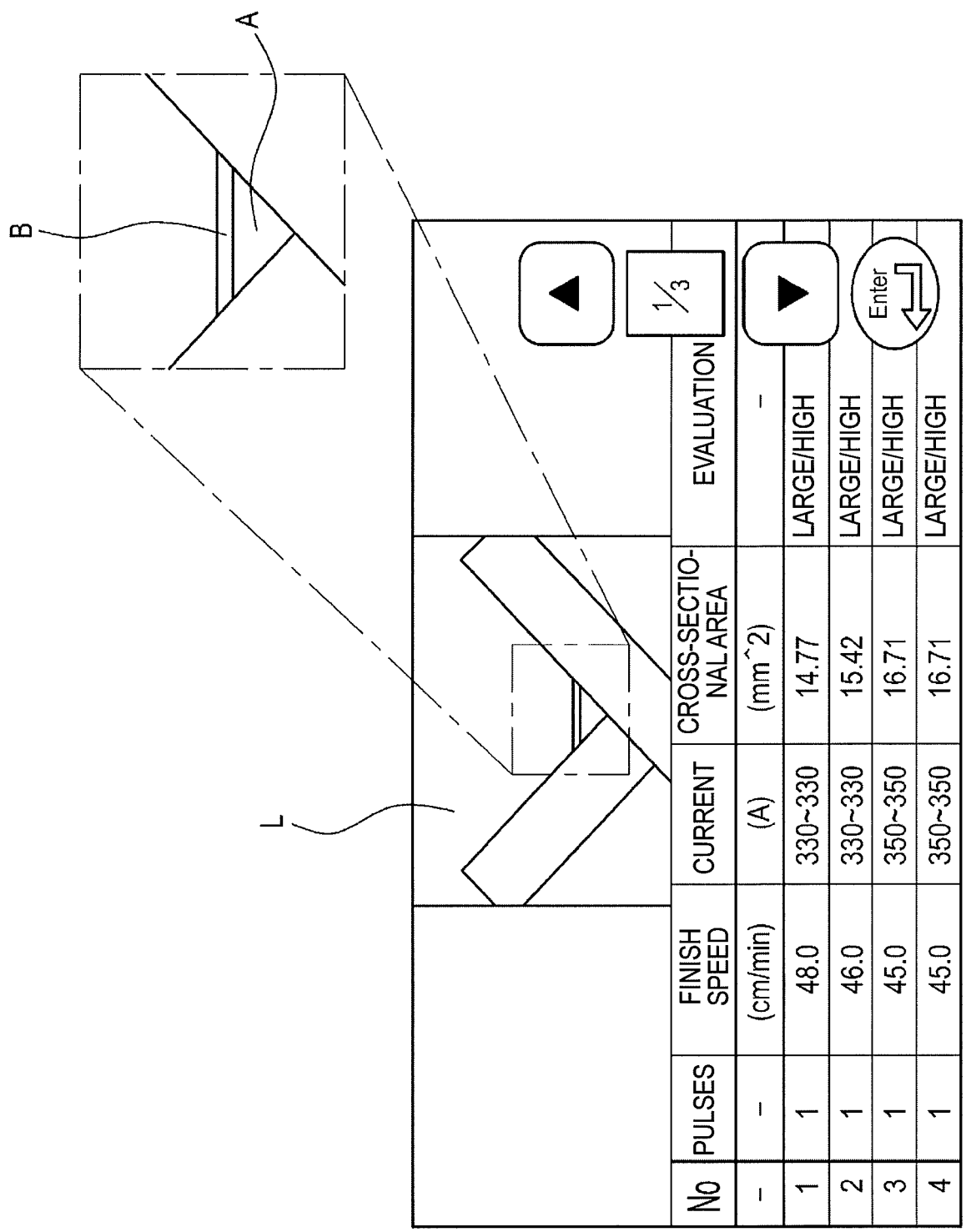
FIG. 7 is a diagram illustrating a retrieving target list.

Herein, the control device 4 determines whether the number of retrieving targets (combination of the processing condition parameters selected by the operator), that is, a selection retrieving target number R, is equal to or less than a predetermined number (value) n which is set in advance. For example, the predetermined number set in advance is "15". In FIG. 6, the selection retrieving target number R is "10" when the operator selects a retrieving target satisfying two parameters "Leg length 6.0*6.0" and "Downward". In this case, n R is established. When the condition is satisfied (Step S50; Yes), the control device 4 creates a retrieving target list individually indicating the content of the retrieving target instead of the number of retrieving targets. The robot pendant 3 displays the list in the screen 32 (Step S60). FIG. 7 illustrates an example of the retrieving target list.

In the above example, in the first layer of the retrieving operation, the retrieving target number table of two processing condition parameters illustrated in FIG. 5 is created and displayed (Step S20). In the second layer which is a lower layer of the first layer, the retrieving target number table of two processing condition parameters illustrated in FIG. 6 is created and displayed (Step S40). In other words, the first layer is a combination of Joint shape×Groove shape, and the second layer is a combination of Leg length×Welding posture. In this example, after the first layer and the second layer, Predetermined number n≥Selection retrieving target number R is satisfied (Step S50; Yes), and thus the retrieving target list of FIG. 7 is displayed. However, when the selection retrieving target number R which is the number of retrieving targets selected in the second layer is still large, and Predetermined number n≥Selection retrieving target number R is not established (Step S50; No), the procedure returns to Step S20, and a retrieving target table of a third layer and subsequent layers of the retrieving operation is created. A combination of two processing condition parameters in this case is set arbitrarily, and the retrieving target number table made of combinations of the processing condition parameters and the welding condition parameters may be created and displayed. In general, it is preferable that the combination of the processing condition parameters be determined up to about a fourth layer. For example, the following hierarchical structure of retrieving may be considered.

First layer: Joint shape×Groove shape
    Second layer: Leg length×Welding posture
    Third layer: Groove depth×Groove angle
    Fourth layer: Root face×Welding posture
    Fifth layer: Welding current×Welding speed
    Sixth layer: Welding speed×Welding posture
    Seventh layer: Welding current×Welding posture
    Eighth layer: Welding speed×Welding Heat input In other words, it is preferable that the extracted two parameters in the first layer of the retrieving operation are the joint shape and the groove shape of the processing condition parameter, the extracted two parameters in the second layer of the retrieving operation are the leg length and the welding posture of the processing condition parameter, the extracted two parameters in the third layer of the retrieving operation are the groove depth and the groove angle of the processing condition parameter, and the extracted two parameters in the fourth layer of the retrieving operation are the root face and the welding posture of the processing condition parameter.

In the above hierarchical structure, the parameters are including a combination of two processing condition parameters up to the fourth layer, and by a combination of two processing condition parameters from the fifth layer. In the fifth layer and the subsequent layers, at least one of the extracted two parameters is preferably a welding condition parameter. With such a hierarchical structure, the parameters can be narrowed to an appropriate processing condition parameter and an appropriate welding condition parameter for various welding. However, the combination of the parameters of each layer is not particularly limited. The order of the layers is also not particularly limited.

In this way, at a stage where a predetermined condition is established, the screen transitions from a table (retrieving target number table) showing the number of retrieving targets to a list (retrieving target list) individually showing the retrieving target. Therefore, it is possible to prevent that a number of retrieving targets are displayed in the screen, and the retrieving can be made easily.

However, for example, when the operator wants to confirm the content of the individual retrieving target even when the number of retrieving targets is large, the retrieving target list may be displayed by operating a predetermined key of the robot pendant 3 even though n≥R is not established (Step S50; No). In other words, regardless of a magnitude relation between n and R, the operator may operate any key of the robot pendant 3 to make a direct transition from the retrieving target number tables of FIGS. 5 and 6 to the screen of the retrieving target list of FIG. 7.

The control device 4 extracts the welding condition parameter of the welding condition information corresponding to the further-extracted processing condition parameter when the retrieving target list is created. Herein, the welding condition parameter is a parameter indicating a specific type or a numerical value of the welding condition information. For example, in the example of FIG. 7, the welding condition information of the retrieving targets Nos. 1 to 4 is illustrated. However, a finish speed (working efficiency) is one of the welding condition parameters, and is displayed by a specific numerical value such as "48.0", "46.0", and "45.0". A welding cross-sectional area (welding amount) is also one of the welding condition parameters, and is displayed by a specific numerical value such as "14.77", "15.42", and "16.71".

The robot pendant 3 displays the retrieving target list in which at least one welding condition parameter and an evaluation item which is a calculation result of the control device 4 are included in each retrieving target. Further, in the welding condition parameter included in the retrieving target list, at least one parameter related to the welding amount or the working efficiency is included. In the example of FIG. 7, there are included the parameters of "Welding cross-sectional area" (further detailed) related to the welding amount and "Finish speed" (further detailed) related to the working efficiency. In the example of FIG. 7, in the welding condition parameter of the retrieving target No. 1 "Finish speed (working efficiency)" is 48.0, "Current" is 330 to 330, and "Welding cross-sectional area (welding amount)" is 14.77, and "Evaluation item" is Large/High.

In this embodiment, the control device 4 compares the welding cross-sectional area of the welding portion calculated from the extracted processing condition parameter and the extracted welding condition parameter with a predetermined threshold, and calculates the evaluation item with respect to the welding amount by stages. The robot pendant 3 displays the evaluation item by stages. In the retrieving target list of FIG. 7, a stack diagram L of the welding portion is additionally displayed (not essential), and the welding cross-sectional area can be visually checked. As illustrated in the enlarged view of the stack diagram L, a welding cross-sectional area A calculated from the welding condition parameters such as a welding speed, a welding current, a wire diameter, and a wire feeding speed which are arbitrarily input, and a welding cross-sectional area B calculated from the groove shape and the joint shape are displayed as a stack diagram by a drawing function. Therefore, the operator can evaluate the retrieving target based on all visual information.

The welding cross-sectional area A is a cross-sectional area which is calculated from the welding condition parameter (the welding speed, the welding current, the wire diameter, the wire feeding speed, and the like) as described above. On the other hand, the welding cross-sectional area B is a cross-sectional area which is calculated from the groove shape and the joint shape, and serves as a predetermined threshold with respect to the welding cross-sectional area A. When Welding cross-sectional area A=Welding cross-sectional area B is established, the welding condition of the welding cross-sectional area A may be determined as a good condition, and the evaluation item can be set.

For example, the welding cross-sectional area A is obtained as follows. The following elements are basic conditions.

Welding speed V: V (cm/min)=(V×10)/60 (mm/sec)
    Wire diameter R (mm)
    Wire feeding speed S: S (m/min)=(S×1000)/60 (mm/sec)
    Welding efficiency η: $CO_2 \rightarrow 0.95$, $Ar-CO_2 \rightarrow 0.98$ From the above description, the welding amount (volume) ($mm^3$/sec) per unit time becomes $(\eta \times \pi \times R^2 \times S \times 1000)/60$. The welding cross-sectional area ($mm^2$) of 1 path per unit time becomes $(\eta \times \pi \times R^2 \times S \times 1000)/60 \div (V \times 1\%) = (\eta \times \pi \times R^2 \times S \times 100)/V$. The welding cross-sectional area A which is the entire welding amount is obtained by Welding cross-sectional area A=Σ (Welding cross-sectional area of each pulse).

On the other hand, the welding cross-sectional area B may be calculated by obtaining an area of a plane figure which is obtained from the groove shape and the joint shape drawn by the drawing function. For example, when the joint shape is a T joint, the groove shape is a fillet which has a right-angled triangle in top view, and the lengths of two perpendicular sides of the right-angled triangle are S1 and S2, the welding cross-sectional area B (total cross-sectional area) is obtained by the welding cross-sectional area B=(S1×S2)/2.

For example, when the welding cross-sectional area A obtained by the above-described method is 14.77 mm², and the welding cross-sectional area B is 18 mm², a ratio of both areas becomes 14.77/18×100=82.0% (Δ18.0%). The ratio is a comparison of the welding cross-sectional area with the predetermined threshold, and becomes a reference for the quality of the welding cross-sectional area A. Therefore, 82.0% (or Δ18.0%) may be displayed together in the screen of FIG. 7.

The control device 4 compares the finish speeds of the welding portion calculated from the extracted processing condition parameter and the extracted welding condition parameter between the respective retrieving targets (that is, the respective welding conditions) to calculate the evaluation item with respect to the working efficiency by stages. The robot pendant 3 displays the evaluation item by stages. The evaluation item displayed by stages includes, for example, evaluation items of three stages such as "High">"Standard">"Low". The finish speed compares the plurality of welding conditions with each other, and it is possible to evaluate the efficiency as better when a number is larger. For example, in the example of FIG. 7, the evaluation item may be separately set after evaluating as No. 1 (48 cm/min)>No. 2 (46 cm/min)>No. 3=No. 4 (45 cm/min).

The finish speed may be evaluated by converting the multi-path welding speed into a single-path welding speed, and based on a speed comparison of the welding conditions. When D: welding length, T: total welding time of all paths, and t: welding time of each path, the converted welding speed of a single path is obtained by Time $(t)$ = Distance $(D)$/Speed $(v)$, $D/T$ (Converted welding speed of single path) =

$D/(t1 + t2 \ldots + tn) = D/(D/v1 + D/v2 + \ldots + D/vn) =$ $D/D(1/v1 + 1/v2 + \ldots + 1/vn) = 1/(1/v1 + 1/v2 + \ldots + 1/vn)$ In the welding condition parameter of the retrieving target list, the following is contained for example. The control device 4 may calculate the evaluation item not only by the welding cross sectional area and the finish speed, but also by following welding condition parameters.

1) Path number (a type of working efficiency): A path number is compared in the multilayer welding condition and is selected (small path number=less welding time).

2) Current: A condition close to a desire is selected based on a maximum/minimum current and a current of each path.

3) External appearance of bead shape (a type of welding amount): The evaluation item with respect to the bead shape (a type of concept of the welding amount) is calculated by stages. The evaluation item calculated by stages includes, for example, evaluation items of 5 stages such as "Large">"Little large">"Standard">"Little small">"Small" in the case of the groove shape. In the case of the fillet shape, there are evaluation items of five stages such as "Large convex">"Less convex">"Standard">"Less concave">"Large concave".

As described above, the evaluation on various welding condition parameters is displayed in a format of the evaluation item by stages. Therefore, even an operator who does not have knowledge about the welding work can easily perform the evaluation.

Figure 8:
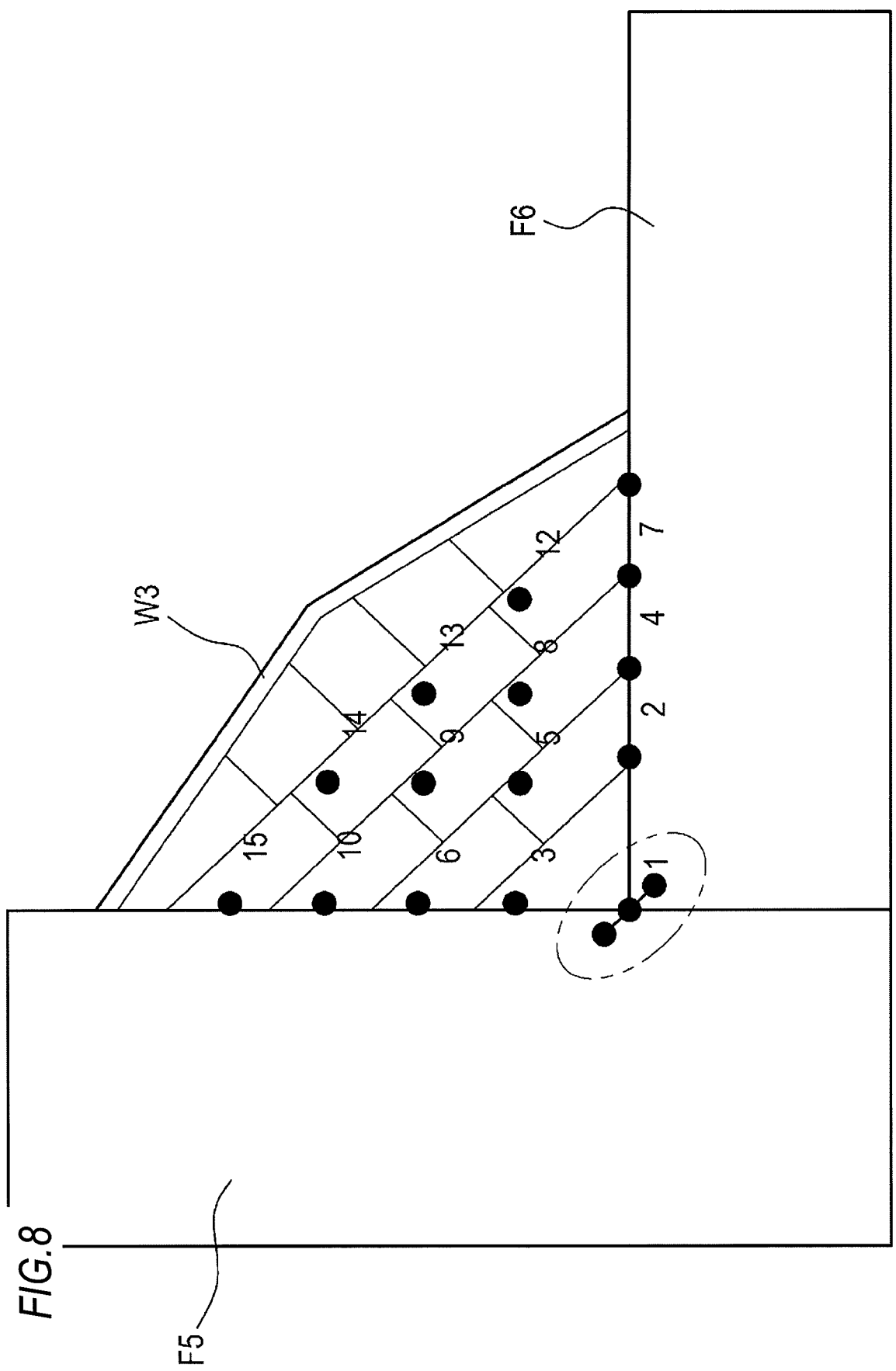
FIG. 8 is a stack diagram of a multilayer welding.

The retrieving target list of FIG. 7 is illustrated as an example where a stack diagram L of the welding portion is additionally displayed. When a welding portion W3 welded by joints F5 and F6 is the multilayer welding as illustrated in FIG. 8, the stack diagram can be drawn in a form of showing the welding paths (1, 2, 3, . . . , and 15). In other words, the database includes the welding condition information in advance which is set for each piece of the processing condition information in the master condition data and the user condition data. The control device 4 draws the stack diagram of the welding portion by the drawing function as illustrated in FIGS. 7 and 8 based on the extracted processing condition parameter and the extracted welding condition parameter, and the robot pendant 3 displays the drawn stack diagram in the screen 32.

When a weaving condition is set in the welding condition in the example of FIG. 8, the information can also be drawn. For example, in a portion surrounded by a two-dot chain line of FIG. 8, weaving with respect to a weaving reference surface (torch direction) by right and left 2 mm in a single path is illustrated.

Figure 9:
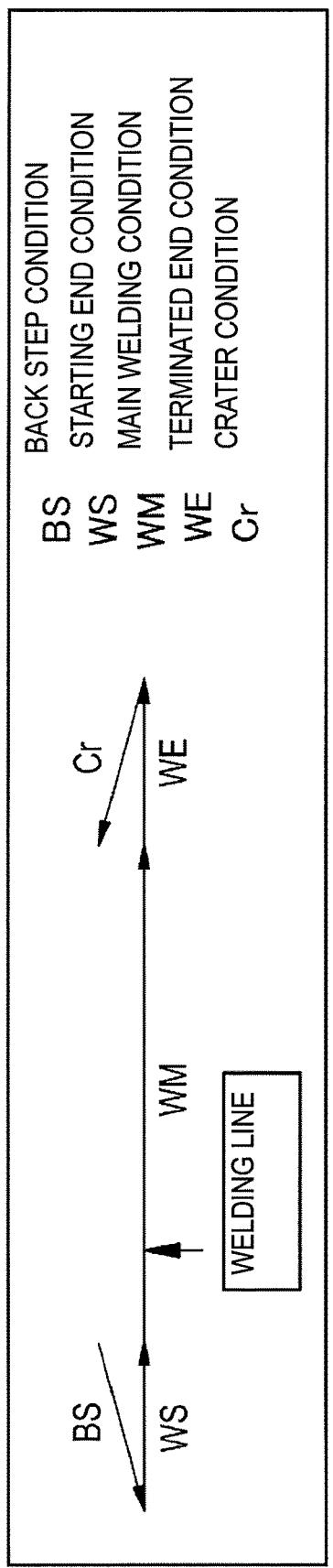
FIG. 9 is a conceptual view for describing an ambient welding condition.

The operator who views the above retrieving target list selects a retrieving target in the retrieving target list of FIG. 7, and can use the retrieving target as a condition related to a main welding condition (WM) of FIG. 9 where the welding is performed on a welding line (Step S70). In a normal welding, an ambient welding portion is provided in order to reinforce the ambient portion of the main welding portion. When a retrieving target is selected, the operator can retrieve at least one ambient welding condition for the ambient welding portion which is associated with the main welding condition in advance and stored in the database 7, and can add the ambient welding condition to the main welding condition. With regard to an ambient welding condition that does not exist, the robot pendant 3 receives a condition (the main welding or another ambient welding condition) input by the operator, and may create an additional condition based on the received condition of the control device 4. With such an addition of the ambient welding condition, all the welding conditions including the main welding condition in the welding line can be simply set to the teach program of the robot. It is possible to reduce an operator's work load of creating the welding conditions. As illustrated in FIG. 9, the ambient welding condition includes the following conditions for example.

Figures 10A, 10B:
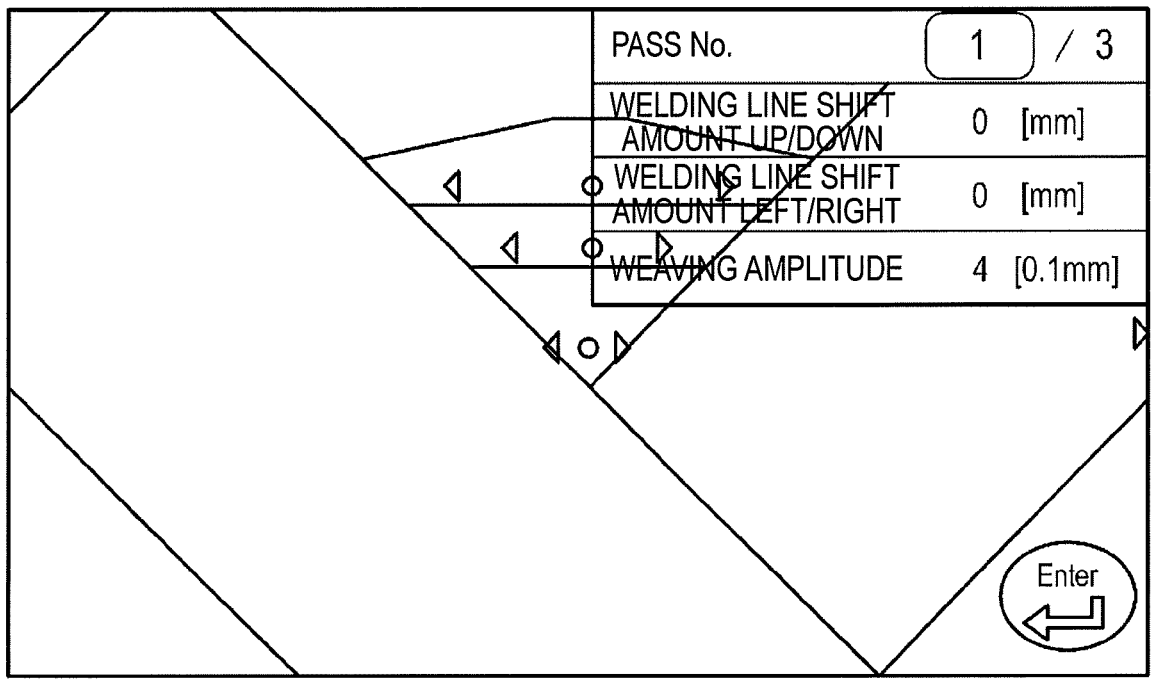

Back step condition (BS): a condition when a starting position of the welding is determined Starting end condition (WS): a condition at the starting end of the main welding Terminated end condition (WE): a condition at the terminated end of the main welding Crater condition (Cr): a condition for preventing a recess of the welding When the operator selects one retrieving target among the retrieving target list of FIG. 7 (Step S70), the operator may properly edit the selected retrieving target (Step S80). The control device 4 edits the stack diagram of FIGS. 7 and 8 according to the retrieving operation of the operator which is received by the robot pendant 3. The robot pendant 3 displays the edited stack diagram in the screen 32. For example, as illustrated in FIGS. 10A and 10B, the operator edits the stack diagram, and an edit operation is displayed in the screen 32 of the robot pendant 3. FIG. 10A is a diagram illustrating an edit screen, and FIG. 10B is a diagram illustrating an edit result confirmation screen, and both are displayed in the screen 32 of the robot pendant 3.

The operator can edit a torch target position (welding shift right/left and up/down) and a weaving amplitude in the edit screen of FIG. 10A, and can edit a welding current and a speed in another screen. In other words, the screen is an edit screen of the welding condition (the target position, the weaving amplitude, the welding current, the speed, and the like). The operator selects a welding condition from the screen of the retrieving target list of FIG. 7, and can confirm a detail of the target position and the like.

Next, the operator confirms the edit content per path in the edit result confirmation screen of FIG. 10B. For example, the numerical value, the drawing, and the heat input of the cross-sectional area according to the welding current and the speed can be confirmed. The operator selects a welding condition from the screen of the retrieving target list of FIG. 7, and can confirm a detail of a welding amount (welding cross-sectional area) and a heat input per path illustrated in FIG. 10B.

With the displaying of the stack diagram of the welding portion, the operator can make an edit while visually evaluating the quality of welding of the selected retrieving target.

Finally, after the edit operation of Step S80, the operator evaluates the actual welding with respect to the welding target, and stores the evaluation as a condition of the retrieving target, so that the processing condition information (processing condition parameter), the welding condition information (welding information parameter) in the database 7 are newly created or edited and registered as the user condition data in association with the stored condition of the retrieving target (Step S90).

The invention is to provide a welding and processing condition setting method for setting the welding and processing condition of the welding robot, and also provide a welding and processing condition setting program for executing the welding and processing condition setting method in a computer. As described above, the program is stored in a memory (not illustrated) of the control device 4, and executes a series of operations in cooperation with the processor of the control device 4. However, the storage places and devices are not particularly limited. The welding and processing condition setting program is different from the teach program of the operation command on the welding robot 2.

According to the invention, the master condition data stored in the database in advance and the user condition data registered at the time of actual welding are included. According to the retrieving operation of the operator, the processing condition parameters and the welding condition parameters of the processing condition information and the welding condition information are extracted from the above data. The control device calculates the evaluation item which is a result obtained by evaluating at least one of the welding amount and the working efficiency. The display device displays at least one of the welding condition parameters and the evaluation item. Therefore, even a beginner in the welding work can easily retrieve an appropriate welding and processing condition. The appropriate welding and processing condition can be set while referring to at least one of the welding condition parameters and the evaluation item. It is possible to realize a highly accurate welding with a high reproducibility.

Hitherto, the invention has been described using the embodiments, but the technical scope of the invention is not limited to the above embodiments. It is obvious to a person skilled in the art that it is possible to change shapes and employ substituting embodiments without departing from the spirit and scope of the invention.

Priority is claimed on Japanese Patent Application (No. 2016-083049) filed on Apr. 18, 2016, and the content of which is incorporated herein by reference.

DESCRIPTION OF REFERENCE NUMERALS AND SIGNS 1 welding robot system
2 welding robot
3 robot pendant (input device, display device)
4 control device
7 database
8 welding and processing condition setting system

The invention claimed is:

1. A welding and processing condition setting system suitable for setting a welding and processing condition of a welding robot, and comprising:
   an input device;
   a display device;
   a control device; and
   a database, wherein:
   the database includes master condition data stored in advance and user condition data registered at a time of actual welding, and each of the master condition data and the user condition data includes (i) processing condition information which is related to a processing condition becoming a precondition for welding and (ii) welding condition information which is related to a welding condition associated with the processing condition;
   the input device receives a retrieving operation of at least processing condition information input by an operator;
   the control device to includes:
     a memory; and
     a processor connected to the memory and that:
     extracts a processing condition parameter of the processing condition information from at least one of the master condition data and the user condition data according to the retrieving operation, to obtain an extracted processing condition parameter;
     extracts a welding condition parameter of the welding condition information from at least one of the master condition data and the user condition data, to obtain an extracted welding condition parameter; and
     calculates an evaluation item which is a result obtained by evaluating at least one of a welding amount and a working efficiency in the extracted welding condition parameter; and
   the display device displays at least one parameter of the extracted welding condition parameter, and the evaluation item.

2. The welding and processing condition setting system according to claim 1, wherein the control device compares a welding cross-sectional area of a welding portion calculated from the extracted processing condition parameter and the extracted welding condition parameter with a predetermined threshold, or compares a finish speed between the welding conditions of each of the welding portions, ahs displays the evaluation item with respect to the welding amount or the working efficiency by stages.

3. A welding robot system comprising:
the welding, and processing condition setting system according to claim 2; and
a welding robot.

4. The welding and processing condition setting system according to claim 1, wherein:
the database includes welding condition information which is set for each piece of processing condition information;
the control device draws a stack diagram of a welding portion based on the extracted processing condition parameter and the extracted welding condition parameter by a drawing function of the control device, to obtain a drawn stack diagram; and
the display device displays the drawn stack diagram.

5. The welding and processing condition setting system according to claim 4, wherein:
the control device edits the stack diagram according to the retrieving operation, to obtain an edited stack diagram; and
the display device displays the edited stack diagram.

6. A welding robot system comprising:
the welding and processing condition setting system according to claim 5; and
a welding robot.

7. A welding robot system comprising:
the welding, and processing condition setting system according to claim 4; and
a welding robot.

8. The welding and processing condition setting system according to claim 1, wherein:
the control device is configured to:
calculate a retrieving target number which is the number of retrieving targets satisfying a combination of two parameters in the extracted processing condition parameter and the extracted welding condition parameter; and
create a retrieving target number table indicating the retrieving target umber in a format of a matrix with the two parameters as keys;
the display device displays the retrieving target number table; and
the display device displays at least one of the welding amount and the working efficiency, and the evaluation item with respect to the retrieving target when the retrieving target number which is received by the input device and selected by the operator is equal to or less than a predetermined value.

9. The welding and processing condition setting system according to claim 8, wherein:
the combination of the two parameters is a joint shape and a groove shape of the processing condition parameter in a first layer of the retrieving operation;
the combination of the two parameters is a leg length and a welding posture of the processing condition parameter in a second layer of the retrieving operation;
the combination of the two parameters is a groove depth and a groove angle of the processing condition parameter in a third layer of the retrieving operation;

the combination of the two parameters is a root face and a welding posture of the processing condition parameter in a fourth layer of the retrieving operation; and
at least one of the combination of the two parameters is a welding condition parameter in a fifth and subsequent layers of the retrieving operation.

10. A welding robot system comprising:
the welding and processing condition setting system according to claim 9; and
a welding robot.

11. A welding robot system comprising:
the welding and processing condition setting system according to claim 8; and
a welding robot.

12. The welding and processing condition setting system according to claim 1, wherein:
the welding condition is a main welding condition to weld a welding line;
the control device retrieves at least one of a back step condition, a starting end condition, a crater condition, and a terminated end condition which are stored in the database and associated with the main welding condition in advance, and is capable of adding the retrieved condition to the main welding condition; and
with respect to a condition which does not exist in the back step condition, the starting end condition, the crater condition, and the terminated end condition, the input device receives a condition input by the operator and creates an additional condition using the at least one condition retrieved by the control device.

13. A welding robot system comprising:
the welding and processing condition setting system according to claim 12; and
a welding robot.

14. A welding robot system comprising:
the welding and, processing condition setting system according to claim 1; and
a welding robot.

15. A welding and processing condition setting method for setting a welding and processing condition of a welding robot, the method comprising:
including, in a database, master condition data stored in advance and user condition data registered at a time of actual welding, each of the master condition data and the user condition data including (i) processing condition information which is related to a processing condition becoming a precondition for welding and (ii) welding condition information which is related to a welding condition associated with the processing condition;
receiving a retrieving operation of the processing condition information which is input by an operator;
extracting a processing condition parameter of the processing condition information from at least one of the master condition data and the user condition data according to the retrieving operation, to obtain an extracted processing condition parameter;
extracting a Welding condition parameter of the Welding condition information from at least one of the master condition data and the user condition data, to obtain an extracted welding condition parameter;
calculating an evaluation item which is a result obtained by evaluating at least one of a welding amount and a working efficiency in the extracted welding condition parameter; and
displaying at least one parameter of the extracted welding condition parameter, and the evaluation item.

16. A computer program product comprising a non-transitory computer readable storage medium having instructions encoded thereon that, when executed by a processor, cause the processor to execute the welding and processing condition setting method according to claim 15.

* * * * *